Dec. 12, 1944.  F. R. W. STRAFFORD  2,365,118
ELECTRICAL APPARATUS
Filed Aug. 25, 1942
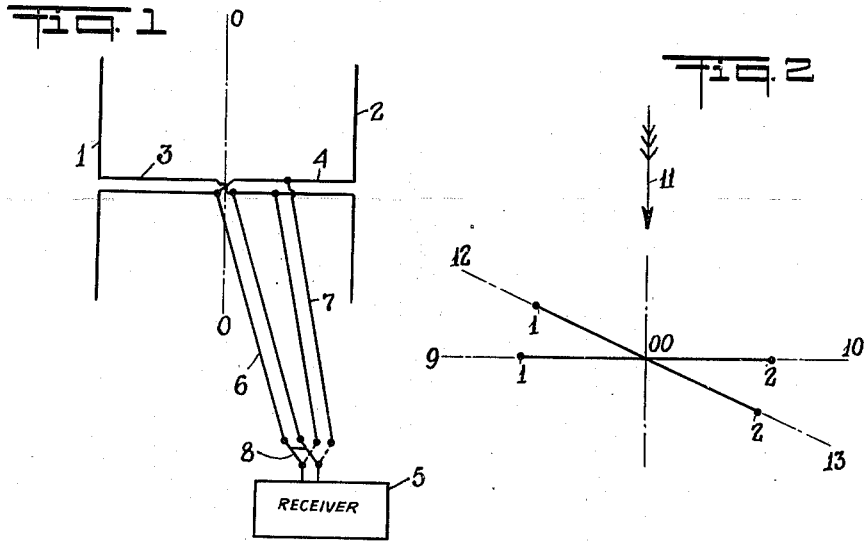
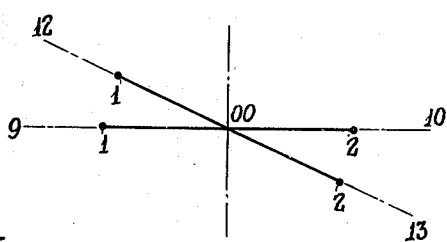
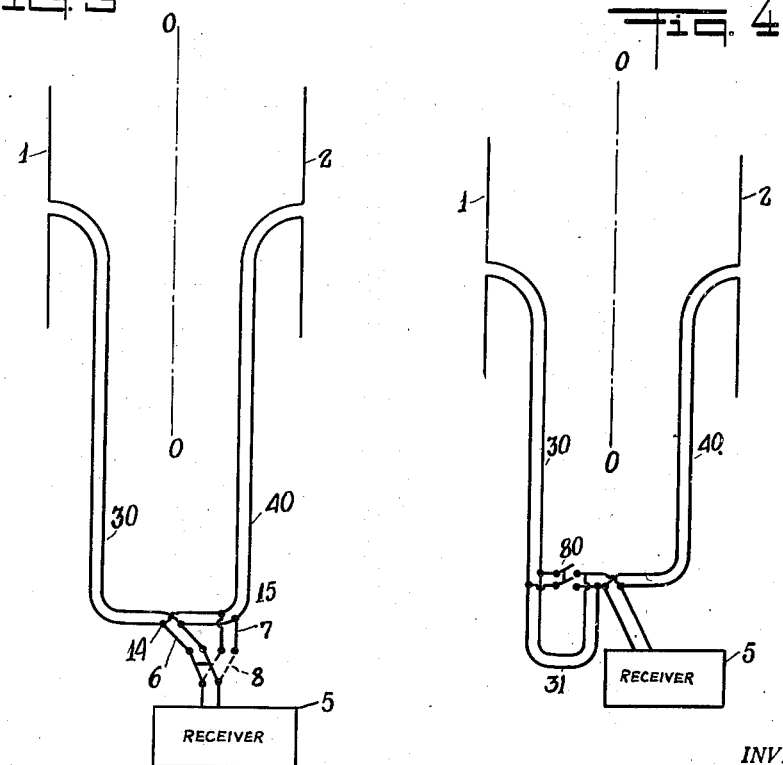
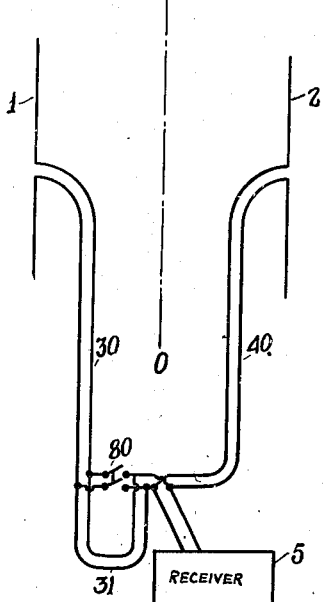
INVENTOR.
Frederick Richmond Wentworth Strafford
BY
ATTORNEY Patented Dec. 12, 1944

2,365,118

UNITED STATES PATENT OFFICE 2,365,118

ELECTRICAL APPARATUS

Frederick Richmond Wentworth Strafford, London, England, assignor to A. C. Cossor Limited, London, England, a British company Application August 25, 1942, Serial No. 456,013
In Great Britain September 13, 1941

12 Claims. (Cl. 250—11)

Some simple types of direction finding radio receiving systems, comprising symmetrical two-element directional aerial arrays and electrically symmetrical feeder systems between aerial array and receiver, give two opposite directions of minimum response to received radio signals. When such a system is employed to determine the direction of an incoming signal, the aerial array is rotated until a minimum response is obtained. But the indication is then ambiguous because the received signal may be arriving from either of two diametrically opposite directions.

The principal object of the present invention is to provide a simple means by which this ambiguity may be removed.

According to the present invention, switching means are provided whereby the feeder system between the aerial array and the receiver can be temporarily rendered asymmetrical, so that a further rotational position of minimum response can be found by further rotation of the aerial array. The direction of said further rotation resolves the ambiguity of the direction finding.

In the accompanying drawing, Figure 1 is a diagrammatic illustration of a radio receiving system embodying the invention in preferred form; Figure 2 is an illustration for the purpose of explaining the mode of operation of apparatus embodying the invention; Figures 3 and 4 are diagrammatic illustrations of two alternative types of radio receiving system embodying the invention.

In the apparatus represented by Figure 1, the aerial array comprises two vertical half-wave dipoles 1 and 2 separated by a distance of half a wavelength of the radio signal to be received. The feeders 3 and 4, from dipoles 1 and 2 respectively, are each a quarter wavelength long, and are connected together in opposition at the vertical axis of symmetry 00 of dipoles 1 and 2. The dipoles and these feeders are mounted for rotation about this axis 00.

The radio receiver 5 is normally connected to one end of feeder 6 of any convenient length; the other end of this feeder is connected to the junction of feeders 3 and 4.

The apparatus as so far described is a well-known type of direction finding radio receiving system. In operation, the aerial array is rotated about the axis 00 until at the receiver a minimum response to the incoming signal is obtained. The indication is, however, ambiguous, because the system gives a minimum response to signals arriving from either direction perpendicular to the plane containing the dipoles 1 and 2.

For the purpose of the present invention, an additional feeder 7 is connected to a tapping on the feeder 4, and switching means 8 are provided to disconnect receiver 5 from feeder 6 and to connect it to feeder 7. It has been found that the best position for the tapping on feeder 4 is at a distance from the junction of the feeders 3 and 4 equal to about one-third of the length of feeder 4.

If the aerial array is rotated until a minimum response to the incoming signal is received while the receiver 5 is connected to feeder 6, as already described, an accurate, but ambiguous, reading for the direction of the signal is obtained. If the receiver 5 is then switched over to feeder 7, a minimum response is no longer obtained. By further rotation of the aerial array another rotational position can be found such that minimum response is obtained. The direction of the further rotation necessary for this purpose is an indication of the direction of the incoming signal which will resolve the ambiguity of the accurate reading already obtained.

This will be further understood by reference to Figure 2. This is a plan view in which the rotational position of the aerial array 1, 2 indicated by the line 9, 10 is such that, with receiver 5 connected to feeder 6, a minimum response is obtained to an incoming signal arriving in the direction of the arrow 11.

When receiver 5 is switched over to feeder 7 and the rotational position of the aerial array is unchanged, the path from dipole 1 through feeder 3 and part of feeder 4, to the junction with feeder 7, is longer than the path from dipole 2 to the junction with feeder 7.

In order that minimum response may be obtained, it is necessary that the signals received by dipoles 1 and 2 shall arrive simultaneously at the junction of feeders 4 and 7. This can be achieved by moving dipole 1 nearer to the source of the incoming signal than dipole 2. A new rotational position of the aerial array, which gives this result, is indicated by the line 12, 13 in Figure 2. It will be seen that the direction from which the incoming signal is arriving is the direction towards which dipole 1, and away from which dipole 2, has been moved in order to reach the new position of minimum response.

It is desirable to arrange that the feeders 6 and 7 shall each, when out of use, present to the feeders 3 and 4, at their junctions therewith, substantially an open circuit. This may be achieved by making the feeders 6 and 7 each to have an electrical length equal to an integral multiple of a half wavelength, and by leaving each open-circuited at the end when it is not connected to receiver 5 by switch 8. Alternatively, this may be achieved by making each of feeders 6 and 7 to have an electrical length equal to an odd integral multiple of a quarter wavelength, and by modifying switch 8 in such manner that each is short-circuited when it is not connected to receiver 5.

In the arrangement shown in Figure 3, feeders 30, 40, of equal length, and of convenient length to reach from dipoles 1 and 2 to the receiver 5, are substituted for the quarter wavelength feeders 3 and 4. They are connected together in opposition at 14. By switching means 8, the receiver 5 is alternatively connected to their point of connection 14 or to a tapping 15 on feeder 40. The precise position of this tapping is immaterial, but it is desirable on the one hand to avoid overlapping of the cusps in the response curves obtained with switch 8 in the alternative positions, and on the other hand to avoid too wide a difference between the rotational positions corresponding to the two minima. With the dipoles spaced half a wave length apart, it has been found that the tapping 15 on feeder 14 may conveniently be at a distance of about $\frac{1}{12}$ of a wavelength as measured in the feeder from the point 14. By bringing the feeders 30, 40 from the dipoles to the lead near to the receiver 5, the length of feeders 6 and 7 is so far reduced as to be negligible, and it becomes unnecessary to take precautions as to their termination when not connected to receiver 5.

In the arrangement shown in Figure 4, the receiver 5 is permanently connected to the junction 14 of feeders 30 and 40. The feeder 30 is, however, made somewhat longer than feeder 40. Switching means 80 are provided to short circuit a part 31 of the length of feeder 30, so that its remaining length is equal to that of feeder 40. With this arrangement an accurate, but ambiguous, reading of the direction of the incoming signal is obtained with the length 31 of feeder short-circuited by switching means 80. The ambiguity is resolved by opening switching means 80 and rotating the aerial array 1 and 2 until a further position of minimum response is obtained.

In the embodiments of the invention illustrated in the accompanying drawing, an aerial comprising two half-wave vertical dipoles separated by a distance of half a wavelength has been shown. It will be evident, however, that the invention may be applied where other types of symmetrical two-element aerial arrays are employed.

I claim:

1. A direction finding radio receiving system comprising a pair of half wave dipoles spaced half a wavelength apart, a pair of feeders having their input ends connected one to each dipole and their output ends connected to each other, a second pair of feeders, one having its input end connected to the junction of said first pair of feeders and the other having its input end connected to a tapping on one of said first pair of feeders, a radio receiver, and switching means to connect said receiver alternatively to the output end of either of said second pair of feeders.

2. A direction finding radio receiver system comprising a pair of half wave dipoles separated by a distance not exceeding half a wavelength, two feeders of unequal length connected one to each of the dipoles at their input ends and connected together at their output ends, a receiver connected to the junction of the output ends of said feeders, and switching means to short-circuit a part of the longer of said feeders whereby its effective length may be reduced to be equal to the length of the shorter of said feeders.

3. A direction finding radio receiving system comprising a pair of half wave dipoles spaced half a wave length apart, a pair of feeders each a quarter wave length long having their input ends connected one to each dipole and having their output ends connected to each other, a second pair of feeders one having its input end connected to the junction of said first pair of feeders and the other having its input end connected to an intermediate point on one of said first pair of feeders, a radio receiver, and switching means to connect said receiver to the output end of either of said second pair of feeders.

4. A direction finding radio receiving system comprising a pair of half wave dipoles spaced half a wave length apart, a pair of feeders each a quarter wave length long having their input ends connected one to each dipole and having their output connected together, a second pair of feeders one having its input end connected to the junction of said first pair of feeders and the other having its input end connected to an intermediate point on one of said first pair of feeders at a distance from said junction of about $\frac{1}{12}$th the wave length, a radio receiver, and switching means to connect said receiver to the output end of either of said second pair of feeders.

5. A direction finding radio receiving system comprising a pair of half wave dipoles spaced half a wave length apart, a pair of feeders each a quarter wave length long having their input ends connected one to each dipole and having their output ends connected to each other, a second pair of feeders one having its input end connected to the junction of said first pair of feeders and the other having its input end connected to an intermediate point on one of said first pair of feeders, a radio receiver, and switching means to connect said radio receiver to the output end of either of said second pair of feeders, each of said second pair of feeders having such a length and being so terminated at its output when not connected to said receiver as to present substantially an open circuit at its input end.

6. A direction finding radio receiving system comprising a pair of half wave dipoles spaced half a wave length apart, a pair of feeders each a quarter wave length long having their input ends connected one to each dipole and having their output ends connected together, a second pair of feeders one having its input end connected to the junction of said first pair of feeders and the other having its input end connected to an intermediate point on one of said first pair of feeders at a distance from said junction of about $\frac{1}{12}$ the wave length, a radio receiver, and switching means to connect said receiver to the output of said second pair of feeders, each of said second pair of feeders having such a length and being so terminated at its output when not connected to said receiver as to present substantially an open circuit at its input end.

7. A direction finding radio receiving system comprising a pair of half wave dipoles spaced at half a wave length apart, a pair of feeders each a quarter wave length long, said feeders having their input ends connected one to each dipole and having their output ends connected to each other, a second pair of feeders one having its input end connected to the junction of said first pair of feeders and the other having its input end connected to an intermediate point on one of said first pair of feeders, a radio receiver, and switching means to connect said receiver to the output of either of said second pair of feeders, each of said second pair of feeders having a length equal to a multiple of a half wave length and arranged to become open circuited at its output when not connected to said receiver.

8. A direction finding radio receiving system comprising a pair of spaced dipoles, a pair of feeders of equal length having their input ends connected one to each dipole and their output ends connected together, a second pair of feeders one having its input end connected to the junction of said first pair of feeders and the other having its input end connected to an intermediate point on one of said first pair of feeders, a radio receiver, and switching means to connect said receiver to the output of either of said second pair of feeders.

9. A direction finding radio receiving system comprising a pair of spaced dipoles, a pair of feeders of equal length having their input ends connected one to each dipole and having their output ends connected together, a second pair of feeders one having its input end connected to the junction of said first pair of feeders and the other having its input end connected to an intermediate point on one of said first pair of feeders spaced by a distance of about $\frac{1}{12}$ the wave length from said junction, a radio receiver and switching means to connect said receiver to the output of either of said second pair of feeders.

10. A direction finding radio receiving system comprising a pair of spaced dipoles, a pair of feeders of equal length having their input ends connected one to each dipole and having their output ends connected together, a second pair of feeders one having its input end connected to the junction of said first pair of feeders and the other having its input end connected to an intermediate point on one of said first pair of feeders spaced at a distance of $\frac{1}{12}$ the wave length from said junction, a radio receiver, and switching means to connect said receiver to the output of either of said second pair of feeders, each of said second pair of feeders having such a length and being so terminated at its output when not connected to said receiver as to present substantially an open circuit at its input end.

11. In a radio direction finding receiving system of the type comprising rotatable spaced aerials having an inherent 180° sense ambiguity, a receiver, symmetrical feeder means connecting said aerials with said receiver, and means for temporarily rendering asymmetrical said feeder means.

12. In a radio direction finding receiving system of the type comprising rotatable spaced aerials having an inherent 180° sense ambiguity, a receiver, a pair of transmission line feeders each connecting one of said aerials with said receiver, and means for temporarily changing the relative electrical length of said feeders.

FREDERICK RICHMOND
WENTWORTH STRAFFORD.